United States Patent [19]

Williams, 3rd et al.

[11] 4,343,332
[45] Aug. 10, 1982

[54] LINE BLIND

[75] Inventors: James W. Williams, 3rd, Lansdale; John S. Fetterolf, Royersford, both of Pa.

[73] Assignee: Fetterolf Corporation, Skippack, Pa.

[21] Appl. No.: 70,030

[22] Filed: Aug. 27, 1979

[51] Int. Cl.³ .............................................. F16L 55/10
[52] U.S. Cl. ................................................... 138/94.3
[58] Field of Search ..................... 138/94.3, 94.5, 94; 137/242, 329.04; 251/167, 158, 187, 195, 204, 326; 222/148

[56] References Cited

U.S. PATENT DOCUMENTS

| | | |
|---|---|---|
| 608,899 | 8/1898 | Ottney ................................. 138/94.3 |
| 1,727,677 | 9/1929 | Siebert et al. |
| 2,035,548 | 3/1936 | Johnson. |
| 2,455,658 | 12/1948 | Dons et al. |
| 2,600,497 | 6/1952 | Hamer. |
| 2,865,393 | 12/1958 | Edge et al. ........................... 138/94.5 |
| 3,099,292 | 7/1963 | Ausburn ............................... 138/94.3 |
| 3,165,124 | 1/1965 | Ausburn et al. ..................... 138/94.3 |
| 3,319,661 | 5/1967 | Shindler ............................... 138/94.3 |
| 3,598,154 | 8/1971 | Brundage ............................. 138/94.3 |
| 4,036,260 | 7/1977 | Davis et al. .......................... 138/94.3 |

Primary Examiner—Houston S. Bell, Jr.
Attorney, Agent, or Firm—Eugene Chovanes; Edward L. Jackson

[57] ABSTRACT

A line blind includes seal rings on either side of a spectacle plate interposed in a pipe, and a special camming arrangement including two cooperating sets of longitudinally directed sloping teeth circularly arranged which operate on slight rotational movement of one, while the other is held stationary, to force engagement under pressure between the seal rings and the plate.

1 Claim, 3 Drawing Figures

FIG. I

LINE BLIND

CROSS REFERENCE

This present application has a parent copending application by the same inventors, namely U.S. patent application No. 862,751 filed Dec. 23, 1977, now abandoned, which is hereby incorporated by reference, and a grandparent application by the same inventors which was copending with the parent application but has since been abandoned, namely U.S. patent application No. 854,617 filed Nov. 25, 1977, now abandoned, the benefit of the filing dates of both of which prior applications are claimed under 35 USC 120.

SUMMARY OF THE INVENTION

Our invention relates to a line blind.

A purpose of our invention is to prevent leakage in connection with the line blind, where it is especially important.

A further purpose of the invention is to make sure that if any seal in the line blind should develop any tendency to leak, this can normally be promptly and readily overcome by a minimum of action which will not even require replacement of the seal.

A further purpose is to provide a line blind which is especially easy and inexpensive to install and replace in a condition of perfect effective lineal and angular alignment and in which any danger of leakage due to misalignment of any kind will be minimized.

Other purposes will be apparent from the remainder of the description and the claims.

SHORT DESCRIPTION OF THE DRAWINGS

DESCRIPTION OF THE PREFERRED EMBODIMENT

Figure 1:
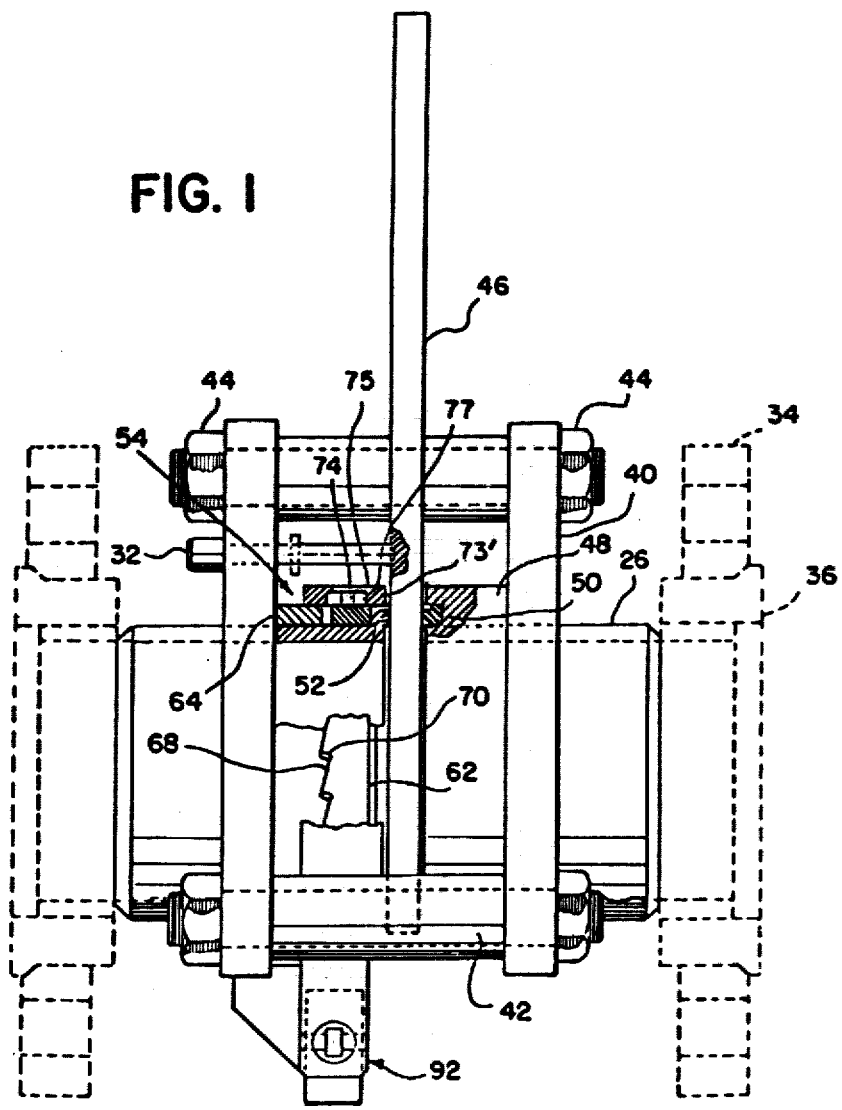
FIG. 1 shows an elevational view partly broken away, taken horizontally and at right angles to the direction of flow in the pipe, of the preferred particular embodiment of our invention, involving line blind, with optional flanges shown in phantom.
Figure 2:
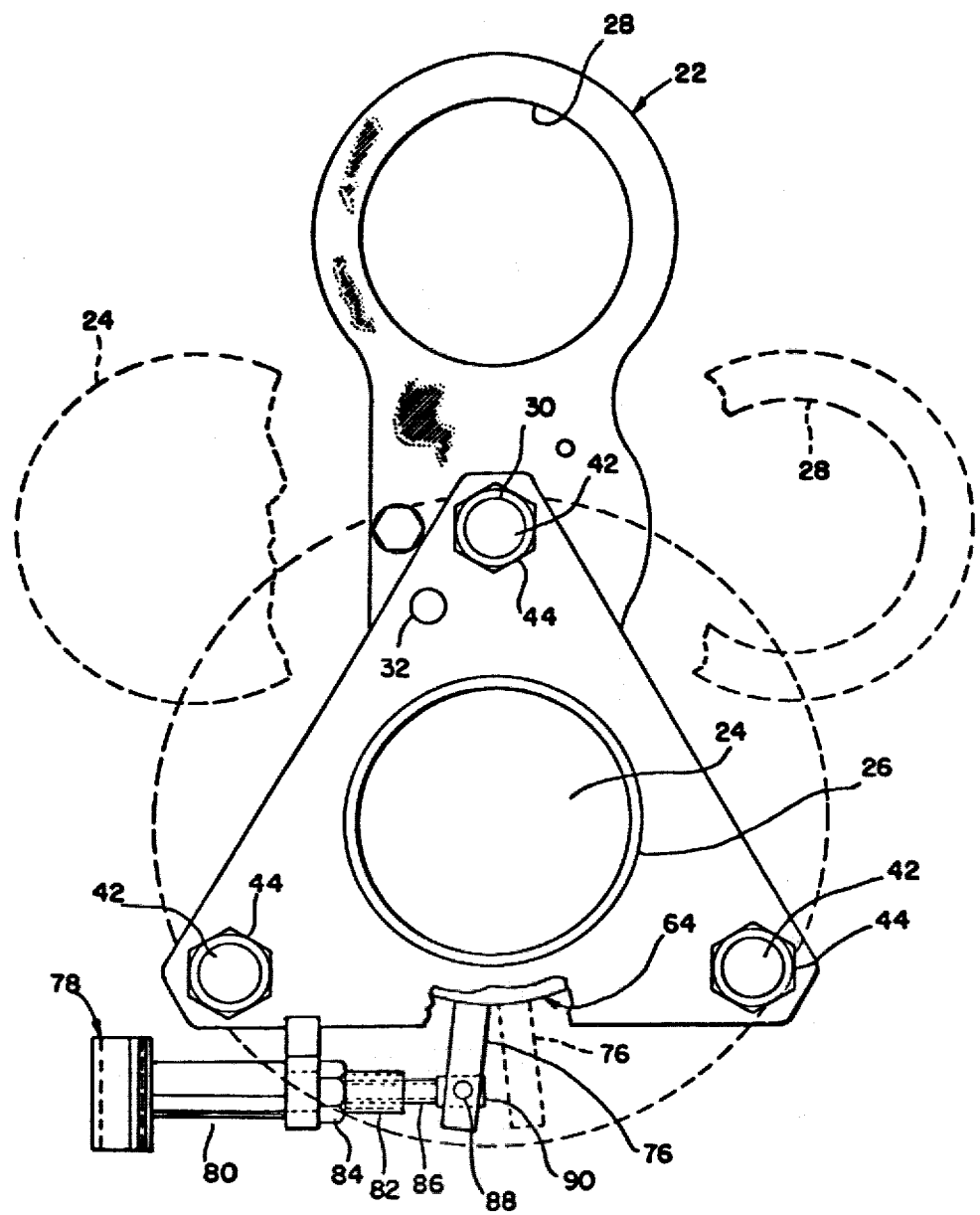
FIG. 2 shows an end elevational view of the same embodiment as FIG. 1, taken longitudinally of the pipe, with a showing of other positions for some of the components also in phantom.
Figure 3:
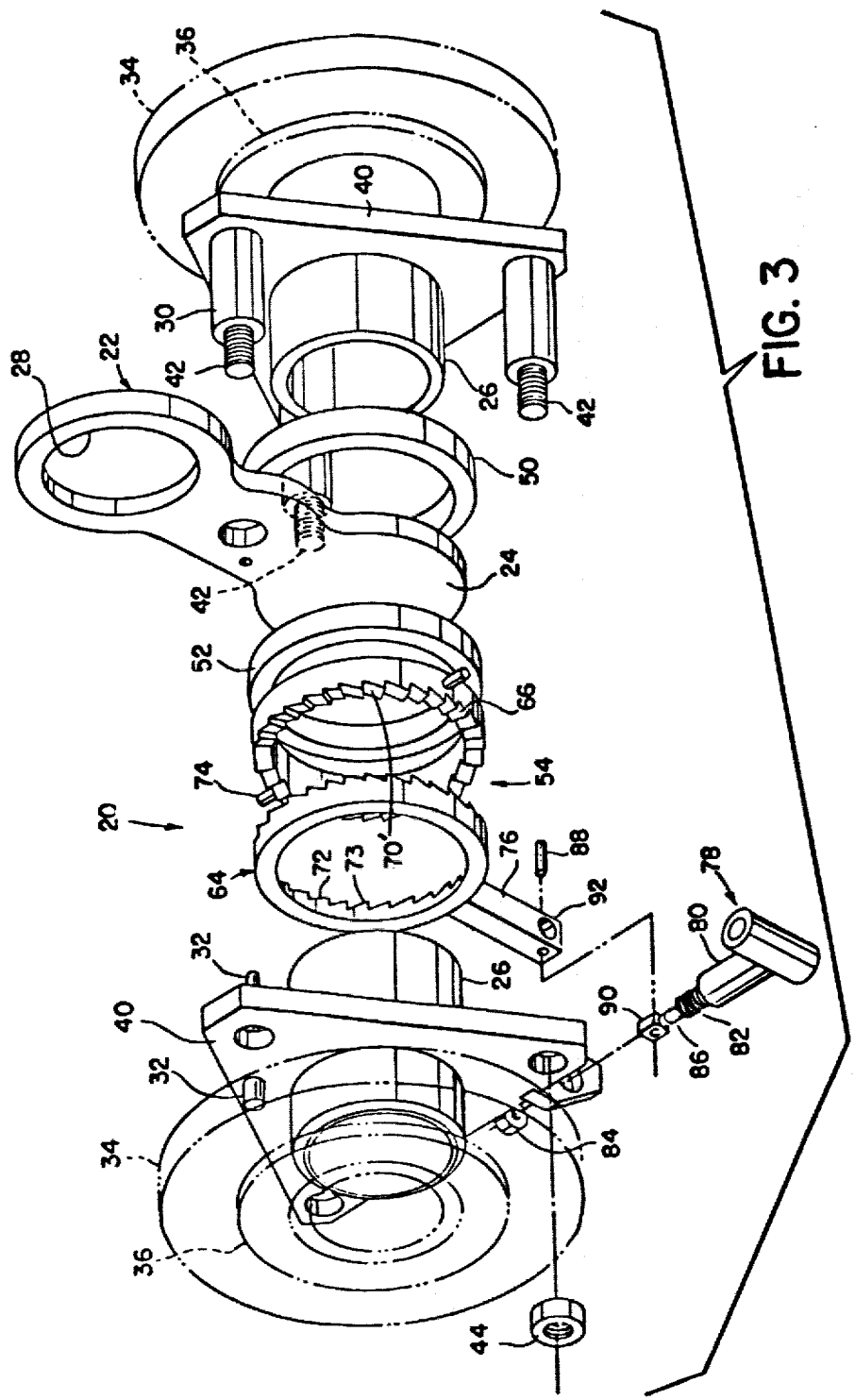
FIG. 3 shows a perspective exploded view from above and to the left, of the same embodiment as FIGS. 1 and 2, but leaving off the annular outer members which hold the seal rings and camming setup on, and showing the seal as if unitary in construction, for simplicity of illustration.

Describing in illustration and not in limitation, and referring to FIGS. 1 through 3:

In this form of embodiment, which involves line blind 20, the device includes a closure setup in the form of spectacle plate 22, which includes at one end a continuous plate 24 for closing off body pipe 26 when desired, and at the other end a circular opening 28 for permitting flow through the pipe when desired, being swung around pivot 30, which passes through its intermediate portion 46, into either of these positions, all as of course per se already well known. Detent 32 serves to hold it in whatever place is selected. Body pipe 26 is a special length of pipe which is intended to be butt welded at the ends into the longer length pipe which the line blind is intended to control, and optionally may have flanges 34 and flange inserts 36 at its ends.

Body flanges 40, more or less triangular in shape, one on either side of the spectacle plate, are held together by bolts 42, one at each corner of the triangle, with suitable nuts 44 at the end. The topmost of the bolts serves as pivot 30 of the spectacle plate.

Outside of the body pipe in its portion within the body flanges is an encircling structure which includes on one side of the spectacle plate stationary annular member 48, which holds against the spectacle plate stationary seal ring 50 which is located in a recess in the inner rim of the annular member on its face toward the spectacle plate. This and the other seal ring used in our device are preferably mostly of some suitable resilient material, such as teflon, together with one or more inserts located against the plate which are made of some more rigid material such as stainless steel. The resilient material likewise comes against the plate in between the inserts and extends further back than and behind the inserts.

On the other side of the spectacle plate, there is also a seal ring 52, preferably of similar type, radially to the inside of one end 73' of outer annular member 75, the end nearest the spectacle plate.

Cam assembly 54 is likewise radially to the inside of that annular member, but away from the spectacle plate as compared to the seal ring 52.

Cam assembly 54 has two cooperating special cams, 62 and 64. Cam 62 is next to and beyond the seal ring 52, longitudinally speaking from the spectacle plate, and in the direction away from that ring has a toothed surface 66 in which a series of gradually sloping surfaces 68 on the longitudinal annular end facing away from the seal ring are separated from each other by abruptly rising tooth surfaces 70 in between.

Cam 64 has a similar toothed surface 72 facing the toothed surface of cam 62, with each tooth of cam 64 fitting into the hollow formed between teeth of cam 62, and each gradually sloping surface 73 of cam 64 corresponding in one position to and facing such a surface of cam 62, once allowance is made for the slight staggering effect of the interfitting as between teeth. The overall effect of the arrangement can be best seen in FIG. 3.

Cam 62 is held in its rotational position by four equally spaced pins 74 extending radially outwardly from its outside surface, riding in longitudinal slots as at 77, which extend deep into outside ring 75, while at the same time the longitudinal direction of the slots permits movement of cam 62 in the longitudinal direction of the pipe.

The back of cam 64, away from its toothed surface, is against the inner face of the nearest body flange 40, while annular member 48 has its far face against the corresponding inner face of the other body flange 40, and the face of seal ring away from the spectacle plate is against the bottom of the recess in the near face of annular member 48.

Cam 64 has a radially outwardly extending actuator arm 76, whose position is fixed by some particular suitable device, such as positioning device 78 which is shown in the drawings. As will be evident from what is there shown, T-member 80 includes a T-head in the form of a tubular cylinder adapted to have some suitable bar inserted in the tube for turning purposes and a cylindrical T-leg ending away from the head in stepped down stem 82 threaded on the outside. Extending beyond this stem toward the actuator is exteriorly threaded arm 86, which extends into the stem from the end, in cooperation with interior threads in the stem. On the end toward the actuator of the arm 86 is flat piece 90 having a hole for pin 88 extending through it between holes in end 92 of actuator arm 76, to attach it to that actuator arm. Stem nut 84 on the outside threads of stem 82 can be tightened against a lug on the bottom of body flange 40 to hold the T-member fixed at whatever position is desired for actuator arm 76.

Cam assembly 60 should have, in each of its cam elements, from 3 through 30 teeth interfitting with those in the other element, as shown in the drawings, and will preferably have 18, so that the circumferential structure of a given element would start to repeat itself every 20 degrees.

The slope of the gradually sloping surface will preferably be uniform, and should be in the range from 5 through 20 degrees, and preferably 12½ degrees, such a surface being for example 70'.

In operation, of course, the spectacle plate essentially is intended to assume one of two positions, a position such as found in FIGS. 2 and 3, in which the plate closes off the line, and a position in which the spectacle plate is swung around an arc of 180° to remove the closed end of the spectacle plate from its position in the line and substitute instead the open end of the spectacle plate, thus permitting free flow through the line.

When it is desired to close the line off and the continuous plate of the spectacle plate is brought across the line, the positioning device can be operated to bring the actuator arm to somewhat rotate cam 64 to bring its teeth less in alignment with the teeth of cam 62, so that their gradually sloping parts of their faces will be contacting each other at points relatively higher up the gradual slopes. This will force cam 62 toward seal ring 52 along a longitudinal path dictated by the pins 74 being confined in their respective longitudinal slots. This will force seal ring 52 tight against plate 24 of the spectacle plate, which in turn will force that plate against seal ring 50 on the other side of that plate, as a result of which the entire circumferential portion of the line will be sealed, to securely and effectively prevent any possibility of leakage around the line blind.

The present invention in line blinds has an especial advantage in that it can very readily be installed or replaced, without the extremely close adjustment required in ordinary line blinds to insure that alignment of the pipeline both laterally and angularly is secured, in order to prevent any possibility of leakage due to misalignment. This is very important in line blinds, whose primary function is likely to be to insure the safety of people down the line by completely blocking off the line and anything flowing in it.

In view of our invention and disclosure, variations and modifications to meet individual whim or particular need will doubtless become evident to others skilled in the art to obtain all or part of the benefits of our invention without copying the apparatus shown, and we, therefore, claim all such insofar as they fall within the reasonable spirit and scope of our claims.

Having thus described our invention, what we claim as new and desire to secure by Letters Patent is:

1. A line blind comprising two tubular opposed body sections having a common longitudinal axis, two circular cross-sectioned tubular, longitudinally inner, end portions each forming part of a different one of these particular body sections, bolting means to rigidly clamp one body section to the other in a fixed position with a fixed gap between their inner end portions, a spectacle plate setup having a plate which includes a solid part and an apertured part and having one position in which the solid part will be interposed between the end portions and another position in which the the apertured part will be interposed between the end portions, as well as a position in which neither is in between, each of the end portions having an annular recess facing the end and a fixed surface in its bottom, which fixed surface in the bottom of the recess limits motion in its direction by anything in the recess, a sealing ring fixed in position in one recess abutting against the fixed surface in the bottom of that recess and projecting out of the top of that recess toward the other end portion but with a space between, there being in the other recess a separate unattached movable sealing ring toward the top of the recess and further into the recess two annular cams facing one another and each having a series of sloping cam surfaces on respective longitudinal annular ends cooperating with one another, one of the cams abutting on the fixed surface in the bottom of that recess, the other cam bearing on the sealing ring above it in the recess, the recess in which the cams and movable sealing ring are present forming and acting as an unobstructed tubular guide for the movable sealing ring all the way up to and including the very top opening of the recess, there being no obstruction short of the fixed sealing ring for movement of the movable sealing ring when the spectacle plate setup is in the position in which neither the solid part nor the apertured part is interposed between the end positions; means for selectively bringing the cams into contact at relatively lower places on the above-mentioned intercooperating sloping cam surfaces and at relatively higher places on the above-mentioned intercooperating sloping cam surfaces at will and thereby urging the cam nearer the top of the recess in the direction of the very top opening of the recess for a greater or lesser distance, the fixed gap between the ends of the end portions, the position of the top of the fixed seal, the thickness of the spectacle plate, and the travel of the cam elements being so interrelated that these features constitute means whereby (a) when the spectacle plate has its solid or apertured part in a position where it is located between the ends of the end portions of the above body sections, the cam movement is enabled to bring the movable seal with pressure against the spectacle plate and the spectacle plate with pressure against the fixed seal, thereby sealing off the interior of the body sections, and whereby (b) when neither the solid nor the apertured part of the spectacle plate is located between the ends of the end portions of the above body portions, the cam movement is enabled to bring the movable seal up into position for ready removal, and whereby (c) any fluid which might happen to come out of the interior of either body section to a position outside of either seal despite the presence of the seal can go outside of the line blind setup as a whole and thus make its presence outside of the interior of the body section evident to someone interested in the effectiveness of the line blind setup.

* * * * *